United States Patent
Hsia

(10) Patent No.: US 10,218,218 B2
(45) Date of Patent: Feb. 26, 2019

(54) SOLID-STATE LIGHTING SYSTEM OPERATED WITH A HIGH DC VOLTAGE

(71) Applicant: Aleddra Inc., Renton, WA (US)

(72) Inventor: Chungho Hsia, Bellevue, WA (US)

(73) Assignee: ALEDDRA INC., Renton, WA (US)

(*) Notice: Subject to any disclaimer, the term of this patent is extended or adjusted under 35 U.S.C. 154(b) by 0 days.

(21) Appl. No.: 16/014,385

(22) Filed: Jun. 21, 2018

(65) Prior Publication Data

US 2018/0301931 A1 Oct. 18, 2018

Related U.S. Application Data

(63) Continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. (Continued)

(51) Int. Cl.
| | |
|---|---|
| *H02J 9/06* | (2006.01) |
| *H05B 33/08* | (2006.01) |
| *H02M 7/217* | (2006.01) |
| *H02M 3/158* | (2006.01) |
| *H02M 7/06* | (2006.01) |
| *H02M 1/00* | (2006.01) |

(52) U.S. Cl.
CPC ............. *H02J 9/065* (2013.01); *H02M 3/158* (2013.01); *H02M 7/217* (2013.01); *H05B 33/0815* (2013.01); *H05B 33/0893* (2013.01); *H02J 2009/068* (2013.01); *H02M 7/06* (2013.01); *H02M 2001/007* (2013.01)

(58) Field of Classification Search
None
See application file for complete search history.

(56) References Cited

U.S. PATENT DOCUMENTS 5,814,971 A * 9/1998 Johnson .................... H02J 9/02
315/86
9,832,826 B2 * 11/2017 Rodriguez ......... H05B 37/0227
(Continued)

*Primary Examiner* — Minh D A
*Assistant Examiner* — James H Cho
(74) *Attorney, Agent, or Firm* — Han IP PLLC; Andy M. Han

(57) ABSTRACT

An LED lighting system comprising a luminaire and an emergency backup system is used to replace a fluorescent or an LED lamp normally operated with AC mains. When a line voltage from the AC mains is unavailable, the emergency backup system is automatically started to provide a high DC voltage larger than a minimum operating voltage of the luminaire. The emergency backup system comprises a rechargeable battery, a driver configured to convert a DC voltage from the rechargeable battery into the high DC voltage when enabled, and a voltage sensing and control circuit comprising a logic circuit and a relay switch configured to enable the driver and to couple the high DC voltage to two electrical conductors of the luminaire to operate the luminaire, no risk of damaging the luminaire.

19 Claims, 3 Drawing Sheets

Related U.S. Application Data

10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2011/0133655 A1* | 6/2011 | Recker | H02J 9/02 315/159 |
| 2016/0141915 A1* | 5/2016 | Descarries | H02J 7/04 315/86 |
| 2016/0328928 A1* | 11/2016 | Lutz | G08B 5/36 |

* cited by examiner

SOLID-STATE LIGHTING SYSTEM OPERATED WITH A HIGH DC VOLTAGE

CROSS-REFERENCE TO RELATED APPLICATIONS

The present disclosure is part of a continuation-in-part (CIP) application of U.S. patent application Ser. No. 15/947,631, filed 6 Apr. 2018, which is part of a CIP application of U.S. patent application Ser. No. 15/911,086, filed 3 Mar. 2018, which is part of a CIP application of U.S. patent application Ser. No. 15/897,106, filed 14 Feb. 2018, which is a CIP application of U.S. patent application Ser. No. 15/874,752, filed 18 Jan. 2018, which is a CIP application of U.S. patent application Ser. No. 15/836,170, filed 8 Dec. 2017, which is a CIP application of U.S. patent application of Ser. No. 15/649,392 filed 13 Jul. 2017, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) lighting systems and more particularly to an LED lighting system that includes an emergency backup system to provide a direct-current (DC) voltage and to operate a luminaire that is normally operated with a line voltage from alternate-current (AC) mains.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with an emergency backup system integrated such that after the LED lamp or the LED luminaire is installed on a ceiling or in a room, the emergency backup system can be individually inspected on site.

SUMMARY

An LED lighting system comprising a luminaire and an emergency backup system is used to replace a fluorescent or an LED lamp normally operated with the AC mains. When a line voltage from the AC mains is unavailable, the emergency backup system is automatically started to provide a high DC voltage larger than a minimum operating voltage of the luminaire and to operate the luminaire. The luminaire comprises at least two electrical conductors configured to couple to the line voltage from the AC mains or the high DC voltage from the emergency backup system, one or more LED arrays, a first full-wave rectifier coupled to the at least two electrical conductors and configured to convert the line voltage from the AC mains into a first DC voltage or to receive and to pass the high DC voltage from the emergency backup system, an input filter configured to suppress radio-frequency interference (RFI) noise, and a Buck circuit coupled to the first full-wave rectifier via the input filter. The Buck circuit is configured to provide a power factor correction and to convert the first DC voltage into a second DC voltage that powers up the one or more LED arrays and to meet LED luminaire efficacy and power factor requirements when the line voltage from the AC mains is available.

The emergency backup system comprises a rechargeable battery, a second full-wave rectifier, a first driver, a second driver, and a voltage sensing and control circuit. The second full-wave rectifier is coupled to unswitched AC mains and configured to convert a line voltage from the unswitched AC mains into a third DC voltage. The first driver comprises an isolated step-down converter, a first ground reference, and a second ground reference electrically isolated from the first ground reference and is coupled to the second full-wave rectifier. The first driver is configured to convert the third DC voltage into a fourth DC voltage that charges the rechargeable battery to reach a fifth DC voltage. The first driver further comprises a control device, a voltage feedback module configured to sustain an operation of the control device, and a transformer comprising a primary winding coupled to the first ground reference, a secondary winding coupled to the second ground reference, and an auxiliary winding coupled to the voltage feedback module. The transformer is configured to provide electrical isolation between the AC mains and the fourth DC voltage relative to the second ground reference.

The second driver comprises a step-up converter comprising a first electronic switch, a second electronic switch, and a center-tapped transformer. The center-tapped transformer comprises a primary winding comprising an upper portion and a lower portion divided by a center-tapped port coupled to a high-potential electrode of the rechargeable battery, wherein the upper portion is driven in one direction with the first electronic switch activated, while the lower portion is driven in the opposite direction with the second electronic switch activated. In other words, the first electronic switch and the second electronic switch operate alternately with 180 degrees out-of-phase once the second driver is enabled. The second driver further comprises a series resonant circuit comprising a capacitor and an inductor as a leakage inductance of a secondary winding of the center-tapped transformer, wherein the capacitor and the inductor are connected in series, further connected to the secondary winding, and wherein the series resonant circuit resonates at a switching frequency controlled by the first electronic switch and the second electronic switch. The second driver is configured to receive the fifth DC voltage from the rechargeable battery and to convert the fifth DC voltage into a sixth DC voltage when the line voltage from the unswitched AC mains is unavailable. The sixth DC voltage is higher than an absolute value of the rated minimum operating AC voltage of the luminaire to make sure such a high DC voltage can operate the luminaire when the line voltage from the unswitched AC mains is unavailable. The second driver further comprises a third full-wave rectifier and an output capacitor at a secondary side of the center-tapped transformer, wherein voltage ripples on the output capacitor show a switching frequency controlled by the first electronic switch and the second electronic switch, and wherein the third full-wave rectifier and the output capacitor are configured to rectify a non-sinusoidal AC voltage generated from the secondary side of the center-tapped transformer and to smooth out the sixth DC voltage. When the line voltage from the unswitched AC mains is unavailable, the sixth DC voltage is applied to the at least two electrical conductors in the luminaire. The sixth DC voltage can pass through the first full-wave rectifier and build up a proper voltage on the input filter. Then, the Buck circuit can convert such a modified sixth DC voltage into a DC voltage similar to the second DC voltage to power up the one or more LED arrays.

The voltage sensing and control circuit comprises a relay switch configured to couple either the line voltage from the unswitched AC mains or the sixth DC voltage to the at least two electrical conductors to operate the luminaire. When a rechargeable battery test is performed, the voltage sensing and control circuit manages to enable the second driver, simulating a power failure situation in which the line voltage from the unswitched AC mains is unavailable. The voltage sensing and control circuit further comprises a first voltage sensing circuit configured to detect whether the line voltage from the unswitched AC mains is available and to control the relay switch to couple the sixth DC voltage to the at least two electrical conductors when the line voltage from the unswitched AC mains is unavailable or when the rechargeable battery test is performed. The first voltage sensing circuit is also arranged to control the relay switch to couple the line voltage from the unswitched AC mains to the at least two electrical conductors to operate the luminaire when the line voltage from the unswitched AC mains is available. The voltage sensing and control circuit further comprises a logic circuit comprising a first controller and a second controller. The logic circuit is configured to receive power from the rechargeable battery or the first driver and to enable or disable the second driver. The logic circuit further comprises a second voltage sensing circuit coupled between the first controller and the second controller. The second voltage sensing circuit is configured to monitor a voltage on the rechargeable battery and to disable the second driver via the first controller when the voltage on the rechargeable battery is less than the fifth DC voltage to prevent the sixth DC voltage from being generated lower than the minimum operating voltage of the luminaire. The second voltage sensing circuit comprises a diode and a Zener diode regulator interconnected cathode-against-cathode. The diode and the Zener diode regulator are configured to build up proper bias voltages on the second controller and the first controller in sequence and subsequently to enable the second driver. The logic circuit further comprises a pair of electrical terminals coupled between the first controller and the second controller and configured to enable the second driver via the first controller when the pair of electrical terminals are short-circuited or to disable the second driver when the pair of electrical terminals are open-circuited. The pair of electrical terminals may be short-circuited by using a jumper or a switch. The logic circuit further comprises a test switch coupled to the first controller, wherein when the rechargeable battery test is performed, the test switch is pressed to build up a bias voltage on the first controller and to enable the second driver via the first controller. The test switch is further coupled to the first voltage sensing circuit to control the relay switch to couple the sixth DC voltage to the at least two electrical conductors when pressed. Each of the first electronic switch and the second electronic switch comprises a metal-oxide-semiconductor field-effect transistor (MOSFET) or a transistor.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
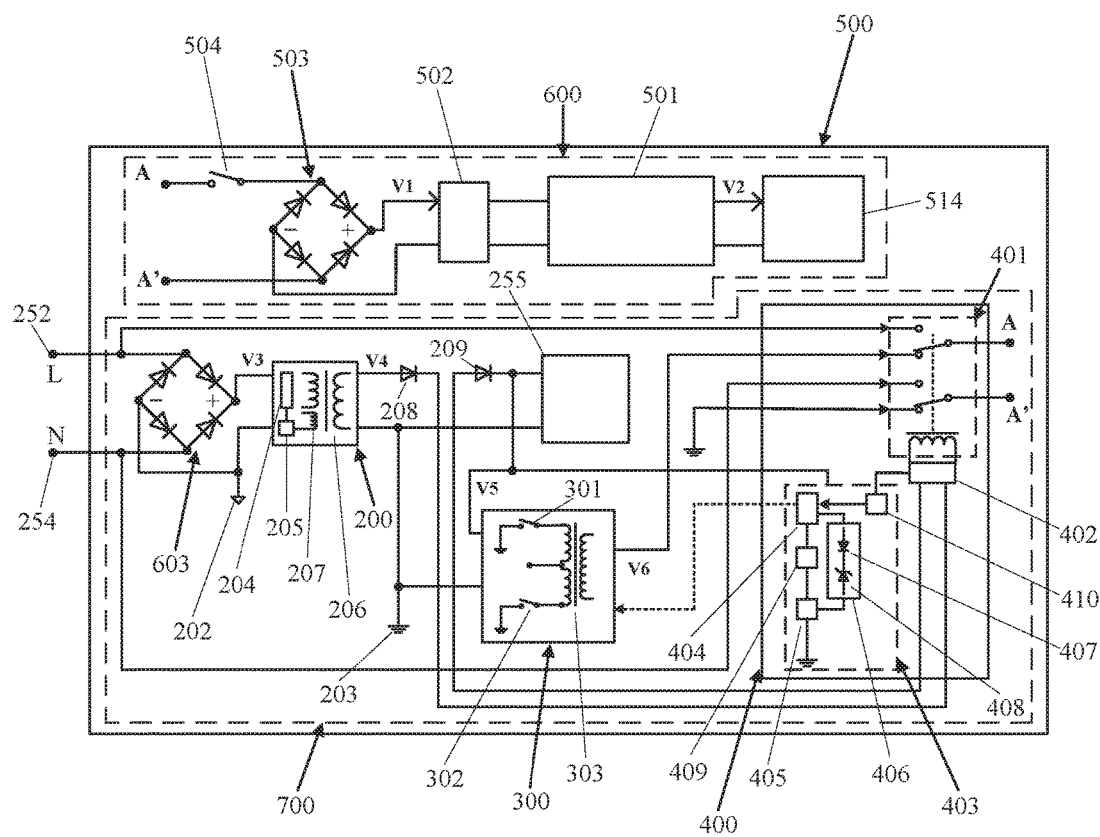
FIG. 1 is a block diagram of an LED lighting system that includes an emergency backup system to provide a high DC voltage to operate a luminaire normally operated with a line voltage from the AC mains according to the present disclosure.

FIG. 1 is a block diagram of an LED lighting system that includes an emergency backup system to provide a high DC voltage to operate a luminaire normally operated with a line voltage from the AC mains according to the present disclosure. The LED lighting system 500 comprises a luminaire 600 and an emergency backup system 700 and is used to replace a fluorescent or an LED lamp normally operated with the AC mains. The LED luminaire 600 comprises one or more LED arrays 514, two electrical conductors A and A'; a first full-wave rectifier 503 connected to the two electrical conductors A and A' via a power switch 504 and configured to convert the line voltage from the AC mains into a first DC voltage, V1, or to receive and to pass the high DC voltage from the emergency backup system 700, an input filter 502 configured to suppress RFI noise, and a Buck circuit 501 coupled to the first full-wave rectifier 503 via the input filter 502. The two electrical conductors A and A' are configured to couple to the line voltage from the AC mains or a high DC voltage generated from the emergency backup system 700 via the power switch 504. The Buck circuit 501 is configured to provide a power factor correction and to convert the first DC voltage, V1, into a second DC voltage, V2, that powers up the one or more LED arrays 514 and to meet LED luminaire efficacy and power factor requirements when the line voltage from the AC mains is available.

The emergency backup system 700 comprises a rechargeable battery 255, a second full-wave rectifier 603, a first driver 200, a second driver 300, and a voltage sensing and control circuit 400. The second full-wave rectifier 603 is coupled to unswitched AC mains via two ports 252 and 254 and configured to convert a line voltage from the unswitched AC mains into a third DC voltage, V3. The first driver 200, an isolated step-down converter, comprises a first ground reference 202 and a second ground reference 203 electrically isolated from the first ground reference 202 and is coupled to the second full-wave rectifier 603. The first driver 200 is configured to convert the third DC voltage, V3, into a fourth DC voltage, V4, that charges the rechargeable battery 255 via a first diode 208, a first voltage sensing circuit 402 in the voltage sensing and control circuit 400, and a second diode 209 to reach a fifth DC voltage, V5. In other words, the first diode 208 is coupled between the first driver 200 and the first voltage sensing circuit 402, whereas the second diode 209 is coupled between the first voltage sensing circuit 402 and the rechargeable battery 255. The first driver 200 further comprises a control device 204, a voltage feedback module 205 configured to sustain an operation of the control device 204, and a transformer 206 comprising a primary winding coupled to the first ground reference 202, a secondary winding coupled to the second ground reference 203, and an auxiliary winding 207 coupled to the voltage feedback module 205. The transformer 206 is configured to provide electrical isolation between the AC mains and the fourth DC voltage, V4, relative to the second ground reference 203. Each of the first diode 208 and the second diode 209 is not necessarily a single diode but one or more diodes to build up voltage drops to properly operate the voltage sensing and control circuit 400 and to charge the rechargeable battery 255 without hazards.

The second driver 300, a step-up converter, comprises a first electronic switch 301, a second electronic switch 302, and a center-tapped transformer 303. The second driver 300 is configured to receive the fifth DC voltage from the rechargeable battery and to convert the fifth DC voltage into a sixth DC voltage when the line voltage from the unswitched AC mains is unavailable. The second driver 300 has a topology that may lead to a maximum efficiency for a battery sourcing application without low-frequency limitations. The gain equation could be $V_{out}=(N_2/N_1) \times V_{in}$, where $N_1$ and $N_2$ are winding turns of a primary winding and a secondary winding of the center-tapped transformer 303, respectively. $V_{in}$ and $V_{out}$ are respectively input and output voltages across the primary winding and the secondary winding. Details will be depicted in FIG. 2 and FIG. 3.

In FIG. 1, the voltage sensing and control circuit 400 comprises a relay switch 401 configured to couple either the line voltage from the unswitched AC mains or the sixth DC voltage, V6, to the at least two electrical conductors A and A' to operate the luminaire 600. The relay switch 401 comprises a double-pole double-throw (DPDT) configuration, in which both "L" and "N" of the line voltage from the unswitched AC mains or both the sixth DC voltage and the second ground reference can be simultaneously connected to the at least two electrical conductors to operate the luminaire without hazards. When a rechargeable battery test is performed, the voltage sensing and control circuit 400 manages to enable the second driver 300. The voltage sensing and control circuit 400 further comprises the first voltage sensing circuit 402 (described earlier) configured to detect whether the line voltage from the unswitched AC mains is available and to control the relay switch 401 to couple the sixth DC voltage to the at least two electrical conductors A and A' of the luminaire 600 when the line voltage from the unswitched AC mains is unavailable or when the rechargeable battery test is performed. The first voltage sensing circuit 402 is also configured to control the relay switch 401 to couple the line voltage from the unswitched AC mains to the at least two electrical conductors A and A' to operate the luminaire 600 when the line voltage from the unswitched AC mains is available. The voltage sensing and control circuit 400 further comprises a logic circuit 403 comprising a first controller 404 and a second controller 405. The logic circuit 403 is configured to receive power from the rechargeable battery 255 or the first driver 200 and to enable or disable the second driver 300. The logic circuit 403 further comprises a second voltage sensing circuit 406 coupled between the first controller 404 and the second controller 405. The second voltage sensing circuit 406 configured to monitor a voltage on the rechargeable battery 255 and to disable the second driver 300 via the first controller 404 when the voltage on the rechargeable battery 255 is less than the fifth DC voltage, V5, to prevent the sixth DC voltage, V6, from being generated lower than the minimum operating voltage of the luminaire 600.

In FIG. 1, the second voltage sensing circuit 406 comprises a diode 407 and a Zener diode regulator 408 interconnected cathode-against-cathode. The diode 407 and the Zener diode regulator 408 are configured to build up proper bias voltages on the second controller 405 and the first controller 404 in sequence and subsequently to enable the second driver 300. The logic circuit 403 further comprises a pair of electrical terminals 409 coupled between the first controller 404 and the second controller 405 and configured to enable the second driver 300 via the first controller 404 when the pair of electrical terminals 409 are short-circuited or to disable the second driver 300 when the pair of electrical terminals 409 are open-circuited. In this case, the pair of electrical terminals 409 may be short-circuited by using a jumper or a switch. The logic circuit 403 further comprises a test switch 410 coupled to the first controller 404, wherein when the rechargeable battery test is performed, the test switch 410 is pressed to build up a bias voltage on the first controller 404 and to enable the second driver 300 via the first controller 404. The test switch 410 is further coupled to the first voltage sensing circuit 402 to control the relay switch 401 to couple the sixth DC voltage, V6, to the at least two electrical conductors A and A' when pressed. When pressed, the test switch 410 may function to bypass an electric current path from the first driver 200 to the rechargeable battery 255, no interference to the second driver 300 and the voltage sensing and control circuit 400.

Figure 2:
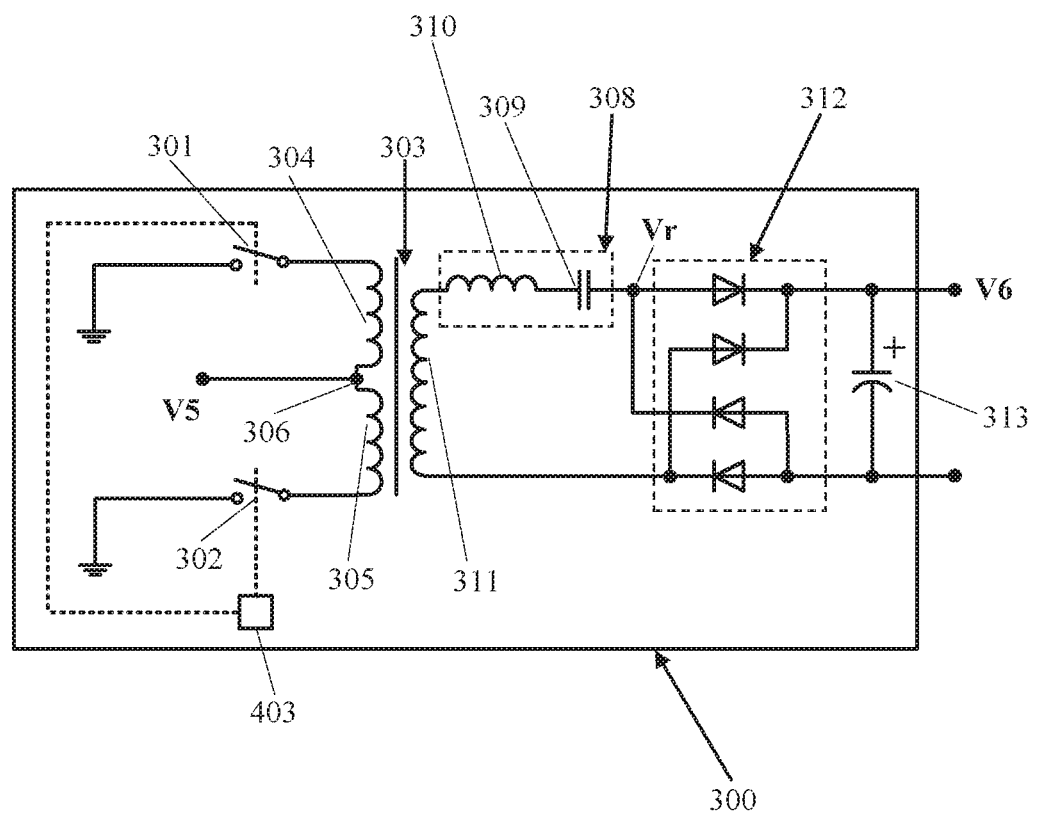
FIG. 2 is an embodiment of a second driver according to the present disclosure.

FIG. 2 is an embodiment of a second driver according to the present disclosure. In FIG. 2, the center-tapped transformer 303 comprises a primary winding comprising an upper portion 304 and a lower portion 305 divided by a center-tapped port 306 coupled to a high-potential electrode (i.e. V5, in FIG. 2) of the rechargeable battery 255, wherein the upper portion 304 is driven in one direction with the first electronic switch 301 activated, while the lower portion 305 is driven in the opposite direction with the second electronic switch 302 activated. In other words, the first electronic switch 301 and the second electronic switch 302 operate alternately with 180 degrees out-of-phase once the second driver 300 is enabled. The second driver 300 is configured to receive the fifth DC voltage, V5, from the rechargeable battery 255 and to convert the fifth DC voltage, V5, into a sixth DC voltage, V6, when the line voltage from the unswitched AC mains is unavailable. The sixth DC voltage, V6, is higher than an absolute value of the rated minimum operating AC voltage of the luminaire 600 to make sure such a high DC voltage can operate the luminaire 600 when the line voltage from the unswitched AC mains is unavailable.

In FIG. 2, the second driver 300 further comprises a series resonant circuit 308 comprising a capacitor 309 and an inductor 310 as a leakage inductance of a secondary winding 311 of the center-tapped transformer 303, wherein the capacitor 309 and the inductor 310 are connected in series, further connected to the secondary winding 311, and wherein the series resonant circuit 308 resonates at a switching frequency controlled by the first electronic switch 301 and the second electronic switch 302. The second driver 300 further comprises a third full-wave rectifier 312 and a capacitor 313 at a secondary side of the center-tapped transformer 303, wherein voltage ripples on the capacitor 313 show a switching frequency controlled by the first electronic switch 301 and the second electronic switch 302, and wherein the third full-wave rectifier 312 and the capacitor 313 are configured to rectify a non-sinusoidal AC voltage generated from the secondary side of the center-tapped transformer 303 and to smooth out the sixth DC voltage, V6. Each of the first electronic switch 301 and the second electronic switch 302 comprises a metal-oxide-semiconductor field-effect transistor (MOSFET) or a transistor.

Figure 3:
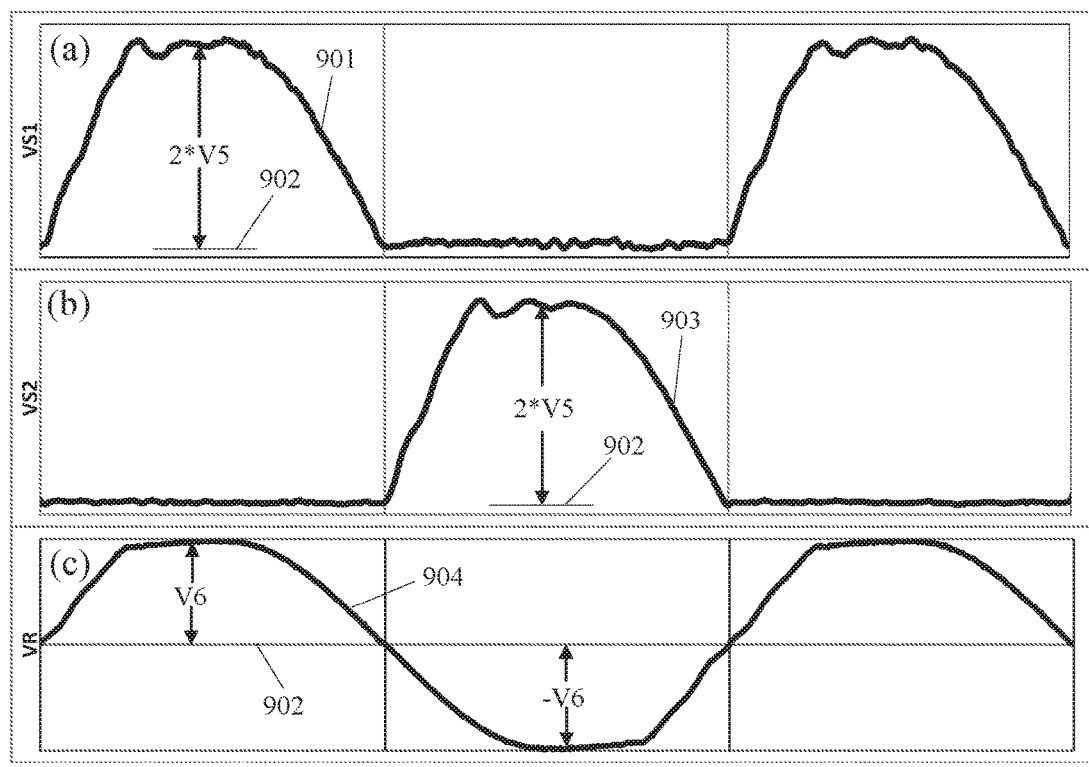
FIG. 3 is voltage waveforms of a primary side and a secondary side of the center-tapped transformer in a second driver according to the present disclosure.

FIG. 3 is voltage waveforms of a primary side and a secondary side of the center-tapped transformer in the second driver according to the present disclosure. In FIGS. 3(a) and (b), respective voltage waveforms on the first electronic switch 301 and the second electronic switch 302 relative to the second ground reference 203 (in FIG. 2), designated as VS1 and VS2, are demonstrated. As can be seen, VS1 has a voltage, substantially at 2*V5, on top of a periodic voltage waveform 901 relative to a zero reference voltage 902, when the first electronic switch 301 is "on", whereas VS2 also has a voltage, substantially at 2*V5, on top of a periodic voltage waveform 903 relative to the zero reference voltage 902, when the second electronic switch 302 is "on". In FIG. 3(c), a periodic voltage waveform of the secondary side of the center-tapped transformer 303 in the second driver 300 is demonstrated. As can be seen, a non-sinusoidal AC voltage, designated as VR, has a voltage, substantially at V6, on a first half cycle of a periodic voltage waveform 904 relative to the zero voltage reference 902, when the first electronic switch 301 is "on", whereas VR has a voltage, substantially at −V6, on a second half cycle of the periodic voltage waveform 904 relative to the zero voltage reference 902, when the second electronic switch 302 is "on". This verifies that the first electronic switch 301 and the second electronic switch 302 operate alternately with 180 degrees out-of-phase once the second driver 300 is enabled. In FIG. 2, VR is connected to the third full-wave rectifier 312 and the capacitor 313. At the output of the third full-wave rectifier 312 and the capacitor 313, the sixth DC voltage, V6, appears (not shown).

Whereas preferred embodiments of the present disclosure have been shown and described, it will be realized that alterations, modifications, and improvements may be made thereto without departing from the scope of the following claims. Another kind of schemes with a high DC voltage adopted in an LED lighting system to operate a luminaire using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) lighting system, comprising:
    a luminaire, comprising:
        at least two electrical conductors configured to couple to a line voltage from alternate-current (AC) mains or a direct-current (DC) voltage from a DC power source;
        one or more LED arrays;
        a first full-wave rectifier connected to the at least two electrical conductors and configured to convert the line voltage from the AC mains into a first DC voltage or to receive and to pass the DC voltage from the DC power source;
        an input filter configured to suppress a radio-frequency interference (RFI) noise; and
        a Buck circuit coupled to the first full-wave rectifier via the input filter, the Buck circuit configured to provide a power factor correction and to convert the first DC voltage into a second DC voltage that powers up the one or more LED arrays and to meet LED luminaire efficacy and power factor requirements when the line voltage from the AC mains is available;
    a rechargeable battery;
    a second full-wave rectifier connected to unswitched AC mains and configured to convert a line voltage from the unswitched AC mains into a third DC voltage;
    a first driver comprising an isolated step-down converter, a first ground reference, and a second ground reference electrically isolated from the first ground reference, wherein the first driver is coupled to the second full-wave rectifier and configured to convert the third DC voltage into a fourth DC voltage that charges the rechargeable battery to reach a fifth DC voltage;
    a second driver comprising a step-up converter comprising a first electronic switch, a second electronic switch, and a center-tapped transformer, the second driver configured to receive the fifth DC voltage from the rechargeable battery and to convert the fifth DC voltage into a sixth DC voltage when the line voltage from the unswitched AC mains is unavailable; and
    a voltage sensing and control circuit comprising a first voltage sensing circuit and a relay switch configured to connect either the line voltage from the unswitched AC mains or the sixth DC voltage to the at least two electrical conductors to operate the luminaire, the voltage sensing and control circuit configured to enable the second driver when a rechargeable battery test is performed,
    wherein:
        the first voltage sensing circuit is configured to detect whether the line voltage from the unswitched AC mains is available and to control the relay switch to couple the sixth DC voltage to the at least two electrical conductors when the line voltage from the unswitched AC mains is unavailable or when the rechargeable battery test is performed, and
        the rechargeable battery test is performed to ensure that the rechargeable battery is in a working condition.

2. The LED lighting system of claim 1, wherein the first driver further comprises a control device, a voltage feedback module configured to sustain an operation of the control device, and a transformer, wherein the transformer comprises a primary winding coupled to the first ground reference, a secondary winding coupled to the second ground reference, and an auxiliary winding coupled to the voltage feedback module, the transformer configured to provide electrical isolation between the AC mains and the fourth DC voltage relative to the second ground reference.

3. The LED lighting system of claim 1, wherein the center-tapped transformer comprises a primary winding comprising an upper portion and a lower portion divided by a center-tapped port coupled to a high-potential electrode of the rechargeable battery, wherein the upper portion is driven in one direction with the first electronic switch activated, and wherein the lower portion is driven in the opposite direction with the second electronic switch activated.

4. The LED lighting system of claim 1, wherein the sixth DC voltage is higher than an absolute value of a rated minimum operating AC voltage of the luminaire to operate the luminaire when the line voltage from the unswitched AC mains is unavailable.

5. The LED lighting system of claim 1, wherein the second driver further comprises a series resonant circuit comprising a capacitor and an inductor as a leakage inductance of a secondary winding of the center-tapped transformer, wherein the capacitor and the inductor are connected in series, further connected to the secondary winding, and wherein the series resonant circuit resonates at a switching frequency controlled by the first electronic switch and the second electronic switch.

6. The LED lighting system of claim 1, wherein the first electronic switch and the second electronic switch operate alternately with 180 degrees out of phase when the second driver is enabled.

7. The LED lighting system of claim 1, wherein the second driver further comprises a third full-wave rectifier and a capacitor at a secondary side of the center-tapped transformer, wherein voltage ripples on the capacitor show a switching frequency controlled by the first electronic switch and the second electronic switch, and wherein the third full-wave rectifier and the capacitor are configured to rectify an AC voltage generated from the secondary side of the center-tapped transformer and to provide the sixth DC voltage.

8. The LED lighting system of claim 1, wherein the first voltage sensing circuit is further configured to control the relay switch to couple the line voltage from the unswitched AC mains to the at least two electrical conductors to operate the luminaire when the line voltage from the unswitched AC mains is available.

9. The LED lighting system of claim 1, wherein the voltage sensing and control circuit further comprises a logic circuit comprising a first controller and a second controller, the logic circuit configured to receive power from the rechargeable battery or the first driver and to enable or disable the second driver.

10. The LED lighting system of claim 9, wherein the logic circuit further comprises a second voltage sensing circuit coupled between the first controller and the second controller, the second voltage sensing circuit configured to monitor a voltage on the rechargeable battery and to disable the second driver via the first controller when the voltage on the rechargeable battery is less than the fifth DC voltage.

11. The LED lighting system of claim 10, wherein the second voltage sensing circuit comprises a diode and a Zener diode regulator interconnected cathode-against-cathode, the diode and the Zener diode regulator configured to build up proper bias voltages on the second controller and the first controller in sequence and subsequently to enable the second driver.

12. The LED lighting system of claim 9, wherein the logic circuit further comprises a pair of electrical terminals coupled between the first controller and the second controller and configured to enable the second driver via the first controller when the pair of electrical terminals are short-circuited or to disable the second driver when the pair of electrical terminals are open-circuited.

13. The LED lighting system of claim 12, wherein the pair of electrical terminals are short-circuited by using a jumper or a switch.

14. The LED lighting system of claim 9, wherein the logic circuit further comprises a test switch coupled to the first controller to build up a bias voltage across the first controller when the rechargeable battery test is performed, and wherein the test switch is pressed to enable the second driver via the first controller.

15. The LED lighting system of claim 14, wherein the test switch is further coupled to the first voltage sensing circuit to control the relay switch to couple the sixth DC voltage to the at least two electrical conductors when pressed.

16. The LED lighting system of claim 14, wherein the test switch functions to bypass an electric current path from the first driver to the rechargeable battery when pressed, no interference to the second driver and the voltage sensing and control circuit.

17. The LED lighting system of claim 1, wherein each of the first electronic switch and the second electronic switch comprises a metal-oxide-semiconductor field-effect transistor (MOSFET) or a transistor.

18. The LED lighting system of claim 1, wherein the voltage sensing and control circuit further comprises a first one or more diodes coupled between the first driver and the first voltage sensing circuit and a second one or more diodes coupled between the first voltage sensing circuit and the rechargeable battery, the first one or more diodes and the second one or more diodes are configured to build up voltage drops to properly operate the voltage sensing and control circuit and to charge the rechargeable battery without hazards.

19. The LED lighting system of claim 1, wherein the relay switch comprises a double-pole double-throw (DPDT) configuration, in which both "L" and "N" of the line voltage from the unswitched AC mains or both the sixth DC voltage and the second ground reference can be simultaneously connected to the at least two electrical conductors to operate the luminaire.

* * * * *